United States Patent Office 3,382,241
Patented May 7, 1968

3,382,241
CERTAIN ORALLY ACTIVE CEPHALOSPORIN ANTIBIOTICS
Edwin H. Flynn, Indianapolis, Ind., assignor to Eli Lilly and Company, Indianapolis, Ind., a corporation of Indiana
No Drawing. Continuation-in-part of application Ser. No. 610,002, Jan. 18, 1967. This application Feb. 27, 1967, Ser. No. 618,989
6 Claims. (Cl. 260—243)

ABSTRACT OF THE DISCLOSURE

7-{2' - [4" - (aminoalkyl)phenyl]acetamido}cephalosporanic and desacetoxycephalosporanic acid compounds useful for combating microbial infections, and of special interest for their activity as antibiotics when taken orally.

CROSS-REFERENCE

This application is a continuation-in-part of my copending application, Ser. No. 610,002, filed Jan. 18, 1967, now abandoned.

BACKGROUND OF THE INVENTION (1) Field of invention.—The compounds of this invention can be categorized as being cephalosporin compounds in that they fit the following general structure:

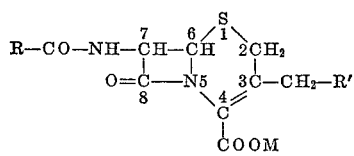

where R represents an organic radical, R' is either hydrogen or acetoxy, and M represents a pharmaceutically acceptable cation. The compounds contain a double bond in the 3-position, a dihydrothiazine ring, and a fused β-lactam. Some of the compounds of this class have shown promise as being practical antibiotics in combating diseases caused by various Gram-positive and Gram-negative microorganisms. A few cephalosporin compounds, for example, sodium cephalothin [7-(2'-thienyl)acetamidocephalosporanic acid, sodium salt], are being administered as a parenteral antibiotic on a substantial commercial scale. There is however, a continuing need for different and improved antibiotics. This invention provides such an improvement in that the compounds of this invention have demonstrated substantial activity as antibiotics when administered orally.

(2) Description of the prior art.—The compounds of this invention are more closely related structure-wise to 7-(2'-phenylacetamido)cephalosporanic acid and 7-[2'-(4"-aminophenyl)acetamido]cephalosporanic acid. However, such compounds have shown no substantial utility as oral antibiotics.

SUMMARY OF THE INVENTION

The new compounds of this invention are the free acid, inner salt, and pharmaceutically acceptable salts of compounds of the formula:

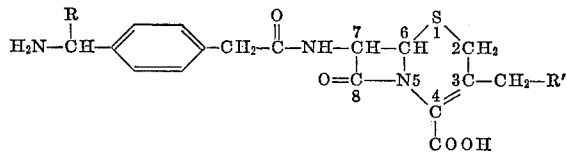

wherein R is hydrogen or lower alkyl having from one to two carbon atoms, and R' is hydrogen or acetoxy, which may be single compounds or varying mixtures of stereoisomeric forms of optically active isomers. These compounds are generally prepared as the zwitterion or inner salts. They may also be used in the form of salts with a pharmaceutically acceptable base such as the alkali metal salt form, e.g., as the sodium or potassium salts, and the ammonium and substituted ammonium and amine salts or as the anion in a pharmaceutically aceptable anionic salt, with a strong acid (i.e., an acid addition salt with a strong acid having a pK'a of less than 4), e.g., as the salt with hydrochloric acid, sulfuric acid, hydrobromic, phosphoric, or trifluoroacetic acid, and the like. It is preferred to manufacture and use these compounds as antibiotics in the above indicated zwitterion or inner-salt form. Examples of compounds of this invention are named below as the free amino acid compounds but it is understood that they can be used in the various salt forms indicated above.

7 - [4 - (aminomethyl)phenylacetamido]cephalosporanic acid

7 - [4 - (α-aminoethyl)phenylacetamido]cephalosporanic acid

7 - [4-(α-aminopropyl)phenylacetamido]cephalosporanic acid

7-[4'-(α-aminoethyl)phenylacetamido]desacetoxycephalosporanic acid, and

7 - [4' - (α-aminopropyl)phenylacetamido]desacetoxycephalosporanic acid

The novel cephalosporanic acid compounds of the present invention are related to cephalosporin C insofar as they contain the 5,6-dihydro-6H-1,5-thiazine ring with a fused β-lactam ring in the 5,6-position which is characteristic of cephalosporin C. However, unlike cephalosporin C, which contains the 5'-amino-N'-adipamyl group in the 7-position, the compounds of the present invention are characterized by an acylamido group in the 7-position having an α-amino-lower alkyl substituent in the 4-position on the phenyl ring of a phenylacetic acid acylating moiety. The new desacetoxycephalosporanic acid compounds contain, in addition, a methyl group in the 3-position instead of an acetoxymethyl group as does cephalosporin C. Moreover, unlike cephalosporin C, which has a relatively low antibacterial action, the compounds of the present invention are highly effective antibacterial agents, capable of inhibiting the growth of numerous types of microorganisms in a variety of environments.

Cephalosporin C, which is the most convenient starting material to make the compounds of this invention, can be prepared by cultivating a cephalosporin C-producing organism in a suitable nutrient medium as described in British patent specification 810,196, published Mar. 11, 1959. Cephalosporin C may also be prepared by a method described in U.S. Patent 3,082,155 issued Mar. 19, 1963, involving the use of cephalosporin C-producing mould of the species of which Cephalosporium I.M.I. 49137 is a member in a medium containing suitable nutrient materials including a source of organic nitrogen, in the presence of molecular oxygen, and the separation of cephalosporin C thereby produced.

Cephalosporin C is readily converted into the corresponding nucleus compound, 7-aminocephalosporanic acid (7-ACA), by cleaving the 5'-amino-N'-adipamyl side chain between its amido carbonyl group and its amido nitrogen, suitably by reacting cephalosporin C with nitrosyl chloride in formic acid, then hydrolytically cleaving, according to the method of Morin et al., described in U.S. Patent 3,188,311, which issued June 8, 1965.

When the desacetoxycephalosporanic acid compounds are desired, cephalosporin C can be converted to desacetoxycephalosporanic acid (7-ADCA) by conventional methods, e.g., by catalytic hydrogenation of cephalosporin C followed by hydrolytic removal of the 5-aminoadipoyl side chain, as described, e.g., in U.S. Patent 3,129,224, issued Apr. 14, 1964. The 7-ADCA is then used in place of the 7-ACA to prepare the compounds of this invention.

The 7 - {2' - [4" - (α-aminoalkyl)phenyl]acetamido} cephalosporanic acid compounds of the present invention are prepared by acylation of the 7-ACA or 7-ADCA either as the free acid or as a suitable water soluble salt such as are described in U.S. Patent 3,207,755, issued Sept. 21, 1965, with an acylating agent of the selected 4-(α-aminoalkyl)phenylacetic acid following conventional acylation procedures. A convenient acylating agent for this purpose is the respective 4-α-aminoalkylphenylacetyl chloride or bromide in which the amino group has been protected in the conventional manner with a blocking group such as carbobenzoxy, carboallyloxy, tert.-butoxycarbonyl, β-oxoalkylidene, furfuryloxycarbonyl, adamantyloxycarbonyl, or the like. The acylation of 7-ACA or 7-ADCA is carried out in water or an appropriate organic solvent, preferably under substantially neutral pH conditions, and preferably at or somewhere below room temperature, e.g., above the freezing point of the reaction mixture and up to about 20° C. In a typical procedure, 7-ACA or 7-ADCA together with a sufficient quantity of sodium bicarbonate or other appropriate alkali, preferably to maintain the pH of the mixture between 5 and 9 and to promote salt formation and solution, is dissolved in aqueous 50 volume-percent acetone, the concentration of the 7-ACA or 7-ADCA being about 1 to about 4 percent by weight. The solution is cooled to around 0° C. to 5° C., and the solution of the protected 4-aminoalkylphenylacetyl chloride or bromide acylation agent is added in about 20 percent excess, with stirring and cooling. The pH of the mixture can be maintained, if it tends to vary, around the neutral level (pH 6 to 7.5) by adding sodium bicarbonate thereto or bubbling carbon dioxide therein. After addition of the acylating agent has been completed, stirring of the reaction mixture is continued, and the mixture is allowed to warm to room temperature. The reaction product is then acidified to around pH 2 with hydrochloric acid or another appropriate acid to form the free acid of the 7-{2'-[4"-(blocked-α-aminoalkyl)phenyl]acetamido}cephalosporanic or desacetoxycephalosporanic acid intermediate, which is then extracted with an organic solvent such as ethyl acetate. The organic solvent extract containing the blocked amino acid derivative of 7-ACA or 7-ADCA is adjusted to around pH 5.5 with an alkaline material such as sodium hydroxide, potassium hydroxide, ammonium hydroxide or a suitable amine or other base containing the sodium, potassium, ammonium or other cation as desired, and is extracted with water. The water solution containing the blocked amino intermediate as the anion in the salt form is separated and evaporated to dryness. The residue is taken up in a minimum quantity of warm methanol and the desired product is precipitated by cooling and/or evaporating, optionally with isopropanol as an antisolvent. The crystalline product obtained thereby is filtered, washed with acetone, and dried.

Before or after crystallization, the intermediate product thus obtained can be treated in a conventional manner to remove the protective group from the aminoalkyl function, suitably by hydrogenation under mild conditions in the presence of a palladium catalyst, or by exposure to mild acid conditions for a short time (e.g., formic acid at about room temperature for about 1–5 hours). This intermediate product may also be treated with trifluoroacetic acid to remove the blocking group and to form the trifluoroacetic acid salt of the desired 7 - {2' - [4"-(aminoalkyl)phenyl]acetamido}cephalosporanic or desacetoxycephalosporanic acid. The trifluoroacetic acid salt group may be removed and the zwitterion form of the product formed by treating this acid salt with any suitable anion exchange resin in a base or acetate form by conventional methods. Anion exchange resins suitable for this purpose include the weak anion exchange materials such as the resins sold under the trade names "Amberlite IR–4B" and "De-acidite-E" in the acetate form, and the strong anionic exchange materials used for the removal of chloride and other anions from the cephalosporin solution exemplified by "Amberlite IRA–400," "Dowex 1" or "De-acidite-FF."

Illustratively, a suitable organic amine anion exchange resin which may be used in preparing the compounds of this invention include those marketed by Rohm and Haas Co. under the trade names "Amberlite LA–1" and "Amberlite LA–2" and described in U.S. Patent 2,870,207. "Amberlite LA–1" anion exchange resin is a member of a family of high molecular weight liquid secondary amines, water insoluble, but readily soluble in hydrocarbons and other nonaqueous solvents. "Amberlite LA–1" resin, e.g., has a structural configuration consisting of two highly branched aliphatic chains attached to the nitrogen atom, a structure responsible for its excellent solubility in organic solvents and extremely low solubility in aqueous solutions. These solubility characteristics, together with the ability of secondary amines to react with acids to form the corresponding amine salts, make the resin effective for the removal of acidic constituents from an aqueous solution.

Acylation of the 7-ACA or 7-ADCA can also be carried out with an appropriate 2-[4'-(α-aminoalkyl)phenyl] acetic acid, employed in conjunction with a carbodiimide, and the acylation proceeds at ordinary temperatures in such cases. Any of the carbodiimides are effective for this purpose, the active moiety being the —N=C=N— structure. Illustrative examples include N,N'-diethylcarbodiimide,
N,N'-di-n-propylcarbodiimide,
N,N'-diisopropylcarbodiimide,
N,N'-dicyclohexylcarbodiimide,
N,N'-diallylcarbodiimide,
N,N'-bis(p-dimethylaminophenyl)carbodiimide,
N-ethyl-N'-(4"-ethyl-2"-oxazinyl)carbodiimide, and the like, other suitable carbodiimides being disclosed by E. H. Flynn, U.S. Patent 3,252,973, which issued May 24, 1966.

Alternatively, the acylation of 7-ACA or 7-ADCA can be carried out with an activated derivative of the selected 2-[4'-(α-aminoalkyl)phenyl]acetic acid, suitably the corresponding acid anhydride, or a mixed anhydride, or an activated ester such as the p-nitrophenyl or cyanomethyl ester.

Some of these 4-(α-aminoalkyl)phenylacetic acid compounds, which as such, or in a form suitable for acylating 7-ACA or 7-ADCA, such as in the acyl halide, mixed anhydride, or haloformate form, contain asymmetric carbon atoms and thus may exist in optically active isomeric forms. These stereoisomeric compounds may be used as separated isomers or as various stereoisomeric mixtures of the optical isomers to prepare the compounds of this invention. An example of mixed compounds of this invention is a stereoisomeric mixture of 7-{2'-[4"-(d- and l-α-aminoethyl)phenyl]acetamido} - cephalosporanic acid, which mixture can be prepared, for example, by reacting 7-ACA with mixtures of 2-[4'-(d- and l-α-aminoethyl)phenyl]acetic acid, or the reactive variants thereof, or by mixing varying proportions of the separated d- and l-isomers of the 7-{2'-[4"-(α-aminoethyl)phenyl] acetamido}cephalosporanic acid compounds prepared as described in Examples 1 to 4 below. When the separate optical cephalosporin isomers are desired, the selected 2-[4'-(α-aminoalkyl)phenyl]acetic acid starting materials can be resolved in a conventional manner such as by reacting the free acid with cinchonine, strychnine, brucine, or the like, then fractionally crystallizing the salts formed to separate the diastereoisomeric salts, and then separately acidifying the separated isomer salts to liberate the desired optical d- or l-acid. Each of the d- and l-2-[4'-(α-aminoalkyl)phenyl]acetic acids, thus obtained, can be employed as such for the 7-ACA or 7-ADCA acylation with a carbodiimide, or may be converted by conventional methods into the corresponding acid halide, mixed anhydride, or haloformate acylating agent, care being exercised to avoid extremes to conditions which might produce racemization.

The invention will be more readily understood from the following operating examples, which are submitted as illustrations only, and not by way of limitation.

Example 1

A mixture of 475 mg. (5 millimoles) of methyl chloroformate in 25 ml. of acetone containing 2 drops of dimethylbenzylamine was cooled in an ice-alcohol bath. To the cooled mixture, thus obtained, 1.4 g. (5 millimoles) of 4-[N-(tert.-butoxycarbonyl)-d-α - aminoethyl]phenylacetic acid in 25 ml. of acetone containing 500 mg. of triethylamine were added dropwise while stirring for 30 minutes to form the mixed anhydride. Then a mixture of 1.5 g. (5.5 millimoles) of 7-ACA in 30 ml. of water containing 550 mg. (5.5 millimoles) of triethylamine which mixture had been treated with charcoal and cooled, was added slowly while stirring over 5 minutes. The mixture was stirred in the cold for an additional hour to insure as complete a reaction as possible to form the blocked amino 7-{2'-[4''-(N - tert.-butoxycarbonyl - d - α - aminoethyl)-phenyl]acetamido}cephalosporanic acid.

The above acid was purified by removing the acetone, washing the residue with water, cooling the mixture and extracting into nonaqueous solvent by acidifying the mixture to pH 2.5 with 1 N hydrochloric acid in the presence of ethyl acetate. No. 7-ACA was observed to precipitate. The solvent system was separated and the product in the ethyl acetate layer was dried over magnesium sulfate. After removal of the ethyl acetate, there was obtained 2.5 g. (93 percent yield) of the desired N-blocked-cephalosporin as an amorphous residue, which could not be made to crystallize. The blocked amino acid derivative of 7-ACA was triturated with diisopropyl ether and dried under vacuum to obtain 2.0 g. of 7-{2'-[4''-(N-tert.-butoxycarbonyl - d-α - aminoethyl)phenyl]acetamido}-cephalosporanic acid which analyzed as follows:

Analysis.—Calcd. for $C_{25}H_{31}N_3O_6$: C, 56.28%; H, 5.86%; N, 7.88%. Found: C, 55.94%; H, 6.41%; N, 6.91%.

The pK'a of the compound was 4.95. The ultraviolet assay was $A_{m_{260}}=8050$ in ethyl alcohol.

Example 2

A 1-g. portion of the 7-{2'-[4''-(N-tert.-butoxycarbonyl - d - α - aminoethyl)phenyl]acetamido}cephalosporanic acid, prepared as described in Example 1, was dissolved in 10 ml. of cold trifluoroacetic acid and stored in cold for two hours to cleave the tert.-butoxycarbonyl blocking group and to form the trifluoroacetic acid salt of 7-{2'-[4'' - (d-α-aminoethyl)phenyl]acetamido}cephalosporanic acid. This salt was precipitated from solution by the addition of anhydrous ethyl ether in three 30-ml. portions. The salt was separated from the liquids and washed in a centrifuge with ethyl ether and dried in a vacuum dessicator. There was thus obtained 800 mg. (78 percent) yield of the trifluoroacetic acid salt of 7-[d-4-α-aminoethyl-phenylacetamido]-cephalosporanic acid which had pK'a values of 4.7 and 9.2. The ultraviolet spectrum in ethanol showed $A_{m_{260}}=7730$.

The trifluoroacetic acid salt of 7-{2'-[4''-(d-α-aminoethyl)phenyl]acetamido}cephalosporanic acid, 500 mg. (0.9 millimole) was dissolved in 4 ml. of water and stirred for 1 hour at room temperature in 20 ml. of liquid 25 percent "Amberlite LA–1" anionic exchange resin in the acetate form in methyl isobutyl ketone. The aqueous phase was separated, washed with methyl isobutyl ketone and then with ethyl ether. The zwitterion (internal salt) product 7-{2'-[4''-(d-α - aminoethyl)phenyl]acetamido}cephalosporanic acid precipitated upon concentration of the mixture in a vacuum but would not crystallize. The weight of product recovered was 265 mg. (68 percent yield). The infrared and ultraviolet spectra were consistent. The compound had a pK'a of 4.8 and 9.35. The compound had a specific rotation of +103.6° C.

This product, 7-{2'-[4''-(d-α-aminoethyl)phenyl]acetamido}cephalosporanic acid, had minimum inhibitory concentrations (MIC) against four clinical isolates of penicillin-resistant Staphylococcus aureus of from 0.2 to 0.8 μg./ml. in the presence of human blood serum and from 0.3 to 0.8 μg./ml. in the absence of serum, as measured in this test by the gradient-plate technique. This product had a median effective dose ($ED_{50}$), given orally twice, of 7.5 mg./kg. against β-hemolytic Streptococcus pyogenes, strain C203, in mice. Against Gram-negative organisms, it had minimum inhibitory concentrations by a standard gradient plate procedure as follows:

| Organisms: | MIC μg./ml. |
|---|---|
| N–9 Shigella sp. | 24 |
| N–10 Escherichia coli | 15 |
| N–26 Escherichia coli | 16 |
| X–26 Klebsiella pneumoniae | 10 |
| X–68 Aerobacter aerogenes | 10 |
| K–1 Klebsiella pneumoniae | >50 |
| Shigella sonnei | 20 |

Example 3

Following the procedure of Example 1, 7-{2'[4''-(N-tert. - butoxycarbonyl - l - α - aminoethyl)phenyl]acetamido}cephalosporanic acid was prepared by reacting 2-[4' - (N - tert. - butoxycarbonyl - l - α - aminoethyl) phenyl]acetyl chloride with 7-ACA. After trituration of the compound in diisopropyl ether, there was obtained 1.8 g. of 7 - {2' - [4''-(N-tert.-butoxycarbonyl-l-α-aminoethyl)phenyl]acetamido}cephalosporanic acid as product, which did not melt but decomposed at about 110° C. The principal ultraviolet reading at $A_{m_{262}}$ mμ in ethyl alcohol was 7400; in water it was 8200. The compound had a pK'a of 4.9, and the infrared spectrum was consistent with this structure. The product analyzed as follows:

Analysis.—Calcd. for $C_{25}H_{31}N_3O_8S$: C, 56.27%; H, 5.86%; N, 7.88%. Found: C, 55.69%; H, 6.39%; N, 7.64%.

Example 4

A 1-g. portion of 7-{2'-[4''-(N-tert.-butoxycarbonyl-l-α - aminoethyl)phenyl]acetamido}cephalosporanic acid, prepared as described in Example 3, was dissolved in 10 ml. of cold trifluoroacetic acid and stored in the cold for 2 hours to effect cleavage of the blocking group and formation of the trifluoroacetic acid salt of 7-{2'-[4''-(l-α - aminoethyl)phenyl]acetamido}cephalosporanic acid. The salt was precipitated from the solution by addition to the solution of three 30-ml. portions of anhydrous ethyl ether. The precipitated salt was separated from the liquid phase, washed on a centrifuge and dried in a vacuum dessicator. The weight of the trifluoroacetic acid salt of 7 - {2'[4''-(l - α - aminoethyl)phenyl]acetamido} cephalosporanic acid was 820 mg. This salt had pK'a values of 4.7 and 9.2. The ultraviolet spectral analysis was $A_{m_{260}}$ mμ=6700.

A 500-mg. portion of the trifluoroacetic acid salt of 7 - {2' - [4'' - (l - α - aminoethyl)phenyl]acetamido}cephalohporanic acid was dissolved in 10 ml. of water and stirred for 1 hour at room temperature with 20 ml. of liquid 25% "Amberlite LA–1" anionic exchanger in the acetate form in methyl isobutyl ketone. The aqueous phase was separated, washed with methyl isobutyl ketone and then with water. Concentration of the aqueous mixture until almost dry produced 275 mg. (70 percent yield) of a crystalline zwitterion (inner salt) of 7-{2'-[4''-(l-α-aminoethyl)phenyl]acetamido}cephalosporanic acid. The ultraviolet spectrum showed $A_{m_{260}}$=7720. This compound had tow pK'a values at 4.7 and 9.3. The infrared spectrum was consistent with this product. The specific rotation of the compound was +97.8° C.

The product, 7-{2'-[4''-(l-α-aminoethyl)phenyl]acetamido}cephalosporanic acid had a minimum inhibitory concentration (MIC) against clinical isolates of penicillin-resistant *Staphylococcus aureus* of 0.1 to 1µg./ml. in the presence of human blood serum, and of 0.4 to 0.5 µg./ml. in the absence of serum, as measured in this test by the gradient-plate technique. This product had a median effective dose (ED$_{50}$) of 5.14 mg./kg., given twice, against β-hemolytic *Streptococcus pyogenes*, strain C203 in mice. Against Gram-negative organisms, it had minimum inhibitory concentrations as follows:

| Organism: | MIC mcg./ml. |
|---|---|
| N–9 | 24 |
| N–10 | 10 |
| N–26 | 11 |
| X–26 | 7 |
| X–68 | 4 |
| K–1 | 750 |
| *Shigella sp.* | 16 |

Example 5

A 2.75 g. (10.4 millimole) portion of 2-[4'-(tert.-butoxycarbonylaminomethyl)phenyl]acetic acid was dissolved in a mixture of 30 ml. of dioxane and 15 ml. of acetone. To the resulting mixture there was added 1.05 g. (10.4 millimoles) of triethylamine in 5 ml. of acetone. The mixture was cooled in a ice-alcohol bath and then there was added dropwise over 20 minutes a solution of 1.41 g. of isobutyl chloroformate in 5 ml. of dioxane while stirring the mixture. The mixture was stirred an additional 10 minutes at about −5° C. to insure complete reaction to form the desired mixed anhydride. To the cooled mixture there was added all at once a freshly prepared solution of 2.83 g. (10.4 millimoles) of 7-ACA and 1.05 g. of triethylamine in 20 ml. of cold water. The mixture was allowed to stand at 0° C. overnight. The mixture was concentrated under vacuum to remove some dioxane and acetone, and then diluted with 30 ml. of water, and washed with 150 ml. of ethyl acetate. The mixture was then layered with 200 ml. of ethyl acetate and treated with 1 N hydrochloric acid to adjust the pH to 2.8 while stirring. The layers were then separated, the ethyl acetate layer was washed with two 100-ml. portions of water, and the ethyl acetate layer containing the blocked amino product was layered over 150 ml. of water and the pH of the mixture was adjusted to pH 6.5 with 1 N potassium hydroxide to form the potassium salt of 7 - {2' - [4'' - (N - tert. - butoxycarbonylaminoethyl) phenyl]acetamido}cephalosporanic acid. This salt in the aqueous phase was washed with 100 ml. of ethyl acetate, and after separation of the aqueous phase from the ethyl acetate, the aqueous phase was dried under vacuum to leave the salt as a semi-crystalline residue. This salt residue was purified by dissolving it in 15 ml. of warm methanol, filtering the resulting solution, and then adding about 15 ml. of isopropanol to crystallize the salt. The salt crystals in the liquid mixture were cooled to 0° C., filtered therefrom, and then dried under vacuum. There was obtained 1.0 g. of the 7-{2'-[4''-(N-tert.-butoxycarbonylaminoethyl ) phenyl ] acetamido } cephalosporanic acid, posassium salt. The infrared spectrum was consistent with the named product. The ultraviolet reading was $A_{m260}$=8140. The pK'a was 4.8.

A 0.75 g. portion of the above salt was dissolved in 15 ml. of water and then 15 ml. of 98 percent formic acid was added. The mixture was stirred at 40° C. for about 3.5 hours. The mixture was then concentrated under a vacuum to a gum which crystallized. The 7-{2'-[4''-(aminomethyl)phenyl]acetamido} - cephalosporanate, which resulted was only slightly soluble in hot or cold water, insoluble in ethyl acetate, and acetic acid, but was soluble in formic acid. The salt was suspended in 10 ml. of water and treated with 1 N hydrochloric acid to pH 1 at which pH most of the solid dissolved. The solution was filtered, the pH was readjusted to 4.2 by the addition of 5 N sodium hydroxide. A small amount of flocculent precipitate formed, which was filtered off. The filtrate containing the 7-{2'-[4''-(aminomethyl)phenyl]acetamido} cephalosporanic acid inner salt was about 20 ml. The filtrate solution was concentrated to dryness under vacuum and crystallization occurred. The crystalline acid was washed with three 2-ml. portions of cold water, and filtered each time. The crystalline product 7-{2'-[4''-(aminomethyl)phenyl]acetamido}cephalosporanic acid had pK'a values of 4.7 and 9.4 in a two-thirds dimethylformamide in water mixture. The infrared spectrum was consistent for this compound. The ultraviolet reading was $A_{m_{260}}$=6930.

The product, 7-{2'-[4''-(aminomethyl)phenyl]acetamido}cephalosporanic acid had a minimum inhibitory concentration (MIC) against four clinical isolates of penicillin-resistant *Staphylococcus aureus* of 0.4 µg./ml. in the presence of human blood serum and 0.8 to 1 µg./ml. in the absence of serum, measured by the gradient-plate technique. The product had a median effective dose (ED$_{50}$) of 6.75 mg./kg., given twice against β-hemolytic *Streptococcus pyogenes* strain C203 in mice. Against Gram-negative organisms, it had the following minimum inhibitory concentrations as measured by a gradient plate technique:

| Organism: | MIC mg./ml. |
|---|---|
| N–9 | 36 |
| N–10 | 10 |
| N–26 | 8 |
| X–26 | 5 |
| X–68 | 4 |
| K–1 | 5 |
| *Shigella sonnei* | 12 |

Example 6

A mixture of 5 g. (0.0186 mole) of 2-[4'-(tert.-butoxycarbonylaminomethyl)phenyl] acetic acid, 1.9 g. of triethylamine, and 2.52 g. of isobutyl chloroformate in 100 ml. of tetrahydrofuran was made to form the blocked amino 2-[4'-(tert.-butoxycarbonylamino-methyl)phenyl] acetyl isobutyl mixed anhydride. To the resulting mixed anhydride-containing mixture, while stirring and cooling, there was added a solution prepared by stirring 4.0 g. of 7-aminodesacetoxycephalosporanic acid in 60 ml. of tetrahydrofuran and 60 ml. of water while adding triethylamine to a pH of 8.

The resulting reaction was allowed to proceed to completion. The intermediate product, 7-{2'-[4''-(N-tert.-butoxy - carbonylaminomethyl)phenyl]acetamido}desacetoxycephalosporanic acid was then isolated by the procedure described in Example 1. There was obtained 2.06 g. of this product which had an ultraviolet reading of $A_{m260}$=4770. It had pK'a values of 5.55 and 7.1. The compound was reprecipitated from diethyl ether and petroleum ether to obtain 1.6 g. of a more pure material having an ultraviolet reading of $A_{m220}$=12,800, $A_{m260}$=5700 with pK'a values of 5.5 and 7.2.

The 1.6-g. portion of the intermediate product 7-{2'-[4'' - (N - tert.-butoxycarbonylaminomethyl)phenyl]acetamido}desacetoxycephalosporanic acid was treated with 6 ml. of trifluoroacetic acid as described in Example 4 to remove the blocking group from the aminomethyl moiety and to form the trifluoroacetic acid salt of 7-{2'-

[4″ - (aminomethyl)phenyl]acetamido}desacetoxycephalosporanic acid which was precipitated from solution by adding ethyl ether. There was obtained 1.2 g. of this salt product. The ultraviolet reading was $A_{m_{260}}=6500$. It had pK'a values of 5.55 and 9.1.

One g. of this trifluoroacetic acid salt was added to 2 ml. of water and 2 ml. of methyl isobutyl ketone in which mixture the salt was not soluble. Three milliliters of water were added and the resulting suspension was treated with the anionic exchange resin, "LA–1" of Rohm and Haas, in the acetate form. After stirring the mixture for about 1 hour to insure complete reaction, the precipitated solid was collected, washed with water, methyl isobutyl ketone, and acetonitrile and dried, yielding 390 mg. of the desired 7-{2'-[4″-(aminomethyl)phenyl]acetamido}-3-methyl-3-cephem-4-carboxylic acid as the inner salt. The infrared spectrum was consistent with this named product. The ultraviolet reading was $$A_{m_{216}}=13070$$

$A_{m_{260}}=7130$. The Moore-Stein test showed one large peak. The product had pK'a values of 5.35 and 9.2.

This 7-{2'-[4″-(aminomethyl)phenyl]acetamido} - 3-methyl-3-cephem-4-carboxylic acid compound was rated effective as an oral antibiotic in a test in mice, given twice to a group of mice as described above. The $ED_{50}$ value was 31.2 mg./kg. of body weight as compared to an $LD_{50}$ value of 3250 mg./kg. In agar dilution tests against various bacteria, this compound had 48 hour MIC values of less than 6.25 microgram/milliliter against *Streptococcus faecales*, less than 6.25 micrograms per milliliter against *Escherichia coli* No. 2. This compound had MIC values against four different clinical isolates of penicillin-resistant *Staphylococcus aureus* of from 5 to 8 micrograms/milliliter (μg./ml.) in the absence of human blood serum and from 5 to 11 μg./ml. in the presence of human blood serum.

I claim:
1. A member of the group consisting of a compound

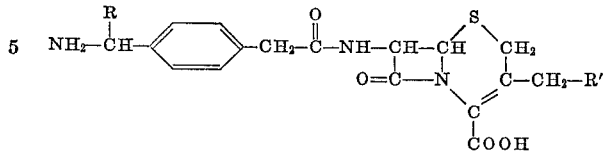

where R is selected from the group consisting of hydrogen and alkyl having from 1 to 2 carbon atoms, and R' is hydrogen or acetoxy, an inner salt thereof, stereoisomeric mixtures thereof, and a salt thereof with a pharmaceutically acceptable acid or base.

2. A compound as defined in claim 1 wherein the compound is 7 - {2' - [4″-(aminomethyl)phenyl]acetamido} cephalosporanic acid.

3. A compound as defined in claim 1 wherein the compound is 7-{2'-[4″-(d - α-aminoethyl)phenyl]acetamido} cephalosporanic acid.

4. A compound as defined in claim 1 wherein the compound is 7-{2'-[4″-(l - α-aminoethyl)phenyl]acetamido} cephalosporanic acid.

5. A mixture of stereoisomers of a compound described in claim 1 wherein the compound is 7-{2'-[4″-(d,l-α-aminoethyl)phenyl]acetamido}cephalosporanic acid.

6. A compound as defined in claim 1 wherein the compound is 7-{2' - [4″-(aminoethyl)phenyl]acetamido}desacetoxycephalosporanic acid.

References Cited
UNITED STATES PATENTS
3,278,531  10/1966  Cox et al. _____ 260—243

NICHOLAS R. RIZZO, *Primary Examiner.*

UNITED STATES PATENT OFFICE
CERTIFICATE OF CORRECTION

Patent No. 3,382,241

May 7, 1968

Edwin H. Flynn

It is certified that error appears in the above identified patent and that said Letters Patent are hereby corrected as shown below:

Column 7, line 9, for "tow" read -- two --; line 73, for "posassium" read -- potassium --; column 10, line 28, for "[4″-(aminoethyl)" read -- [4″-(aminomethyl) --.

Signed and sealed this 24th day of June 1969.

(SEAL)
Attest:

Edward M. Fletcher, Jr.
Attesting Officer

WILLIAM E. SCHUYLER, JR.
Commissioner of Patents